United States Patent Office 2,928,848
Patented Mar. 15, 1960

2,928,848

CHOLINE SALTS OF STEROID COMPOUNDS AND PROCESS OF PREPARING SAME

Wolffe H. Feinstone, Indianapolis, Ind.

No Drawing. Application October 5, 1955
Serial No. 538,813

2 Claims. (Cl. 260—397.4)

This invention relates to choline salts of steroid compounds, and in particular to steroid compounds having estrogenic characteristics.

Estrone is effective when administered parenterally but has virtually no physiological effect when administered orally. A naturally derived compound, sodium estrone sulfate, obtained from pregnant mares' urine, is active orally and quite stable. However, the commercial article is relatively impure and probably owes its stability to the impurities. Sodium estrone sulfate prepared from synthetic estrone is known to be unstable and therefore has not found practical medical use.

One of the objects of this invention is to provide a compound which may be produced from synthetically prepared estrone or related steroid compounds, which is physiologically active upon oral administration, and stable.

Other objects will become apparent to those skilled in the art in the light of the following disclosure.

In accordance with this invention generally stated a compound which may be represented generally by the following structural formula is produced.

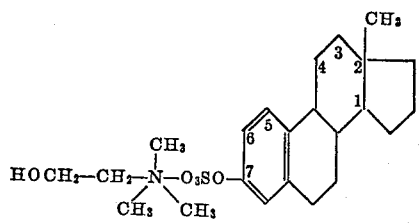

These compounds may be considered as choline salts of the acid sulfate of a steroid compound in which the sulfate is attached to an enolic carbon atom in the 7 position.

A specific example of a compound of this invention is choline estrone sulfate, which may be represented as follows:

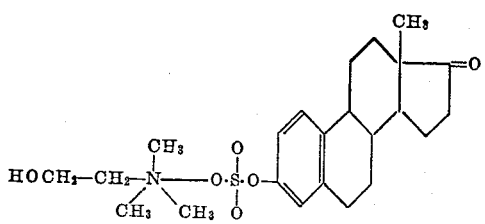

Choline estrone sulfate is a crystalline material which melts with decomposition at 255–8° C., and is readily soluble in water, as contrasted with estrone, which is insoluble in water. It has been found to be physiologically active when administered orally and is quite stable.

The compound has been prepared as follows: To 740 mg. potassium estrone sulfate, 10 cc. water were added and the mixture warmed to 40° C. The solution was not complete. 3.0 cc. of choline base (trimethylhydroxyethylammonium hydroxide) in a 50% aqueous methanol solution were then added to the mixture. The mixture was warmed gently to complete solution. 2 N HCl was added drop-wise until the pH of the reaction mixture was 7.5. The reaction mixture was cooled in an ice bath. A heavy crystalline precipitate formed in about ten minutes. The crystals were filtered off and washed with a small portion of a 50% aqueous solution of methanol. The washed crystals were dried in a desiccator over calcium chloride. The yield of choline estrone sulfate was 550 mg. The mother liquor was partially evaporated on a hot water bath and then cooled in an ice bath to yield a second crop of crystals amounting to about 200 mg.

It is clear that the product can be synthesized in various other ways, using estrone as the starting material. For example, estrone may be converted to the acid sulfate or the acid sulfonyl chloride as by reacting it with chlorosulfonic acid. These, in turn can be reacted with choline base or choline chloride in a suitable solvent to produce choline estrone sulfate.

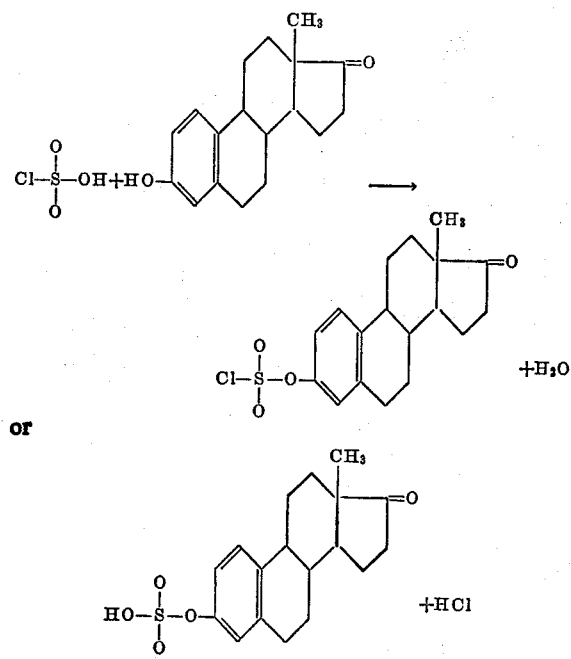

Estrone acid sulfate+choline base→choline estrone sulfate+H₂O or

Estrone acid sulfate+choline chloride→choline estrone sulfate+HCl or

Estrone sulfonyl chloride+choline base→choline estrone sulfate+HCl

Various related estrogenic compounds may be used in place of estrone as starting materials to produce corresponding choline (sulfate) salts. For example, equilenin; equilin; hippulin; 2-methyl-7-hydroxy-1.2-($\Delta^{3'}$-cyclopenteno)-1.2.3.4.9.10.11.12-octahydrophenanthrene; 1-methyl - 7 - hydroxy - 1.2 - cyclopentano - 1.2.3.4 - tetrahydrophenanthrene; 3.17 dihydroxy oestratriene; 3.17 dihydroxyoestrapentaene; $\Delta^{1.3.5}$ - oestratriene-3.16.17-triol; 1.3.5 - estratrien - 17 - one - 3.7.8 - triol or 2 - methyl-7 - hydroxy -1.2 - cyclopentano - 1.2.3.4.9.10.11.12-octahydrophenanthrene. All of the foregoing compounds have known definite physiological effects.

While the physiological effects of the following compounds have not been established, to my knowledge, the following related compounds may be used to form the choline (sulfate) salt. For example: 17-methyl-$\Delta^{1.3.5.(10)}$-oestratrine - 3 - ol; $\Delta^{3.5.17.(20)}$-pregnatrien-3-ol; 19-nor-$\Delta^{1.3.5(10).6.8.22}$ ergostahexaen - 3 - ol; 7-hydroxy-3-keto-1.2-cyclopentano - 1.2.3.9.10.11 - hexahydrophenanthrene, or 2 - methyl - 7 - hydroxy - 1.2 - cyclopentano - 1.2.3.4-tetrahydrophenanthrene; 13-iso-$\Delta^{1.3.5(10)}$-oestratrien-3-ol.

It can be seen that all of these compounds are characterized by having an enolic hydroxyl in the 7 (or, in the oestrane numbering system:

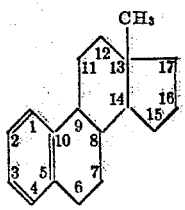

the 3) position, at which position the sulfate radical is attached.

Having thus described the invention, what is claimed and desired to be secured by Letters Patent is:

1. Choline estrone sulfate.

2. The process of producing new therapeutic agents comprising the steps of reacting, with choline base, a compound taken from the group consisting of estrone acid sulfate, an alkali metal estrone sulfate and estrone sulfonyl chloride, and isolating the resultant choline estrone sulfate.

References Cited in the file of this patent

UNITED STATES PATENTS

| 2,005,700 | Johannessohn | June 18, 1935 |
| 2,047,307 | Butenandt | July 14, 1936 |
| 2,178,109 | Schwenk | Oct. 31, 1939 |
| 2,305,727 | Miescher | Dec. 22, 1942 |
| 2,597,723 | Grant | May 20, 1952 |
| 2,636,042 | Salkin | Apr. 21, 1953 |

FOREIGN PATENTS

| 177,414 | Great Britain | Oct. 1, 1935 |
| 499,794 | Great Britain | Jan. 30, 1939 |
| 697,531 | Great Britain | Sept. 23, 1953 |